US010809203B2

(12) United States Patent
Ten et al.

(10) Patent No.: US 10,809,203 B2
(45) Date of Patent: Oct. 20, 2020

(54) INSPECTION DEVICES AND METHODS OF INSPECTING A SLOT (71) Applicant: ROLLS-ROYCE plc, London (GB)

(72) Inventors: Wei Keong Ten, Singapore (SG); Murukeshan Vadakke Matham, Singapore (SG); Iulian Marinescu, Galati (RO); Nicholas Weeks, Knutsford (GB); Wei Yi Yeoh, Singapore (SG); Aswin Haridas, Singapore (SG)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/260,186

(22) Filed: Jan. 29, 2019

(65) Prior Publication Data
US 2019/0257764 A1 Aug. 22, 2019

(30) Foreign Application Priority Data

Feb. 20, 2018 (GB) .................................. 1802693.0

(51) Int. Cl.
G01N 21/88 (2006.01)
F01D 21/00 (2006.01)
(Continued)

(52) U.S. Cl.
CPC ....... *G01N 21/8851* (2013.01); *F01D 21/003* (2013.01); *G01N 21/8806* (2013.01);
(Continued)

(58) Field of Classification Search
CPC .......................... G01N 21/954; G01N 21/8851
See application file for complete search history.

(56) References Cited

U.S. PATENT DOCUMENTS 2,607,267 A   8/1952  Fultz et al.
2,747,463 A   5/1956  Biggs
              (Continued)

FOREIGN PATENT DOCUMENTS

EP   1202053   5/2002
EP   2597273   5/2013
     (Continued)

OTHER PUBLICATIONS

Great Britain search report dated Aug. 14, 2018, issued in GB Patent Application No. 1802693.0.
(Continued)

*Primary Examiner* — William C Vaughn, Jr.
*Assistant Examiner* — Jerry T Jean Baptiste
(74) *Attorney, Agent, or Firm* — Shumaker & Sieffert, P.A.

(57) ABSTRACT

There is described an inspection device for inspecting a slot of a gas turbine engine. The inspection device comprises: an insert for insertion into the slot; a plurality of imaging devices coupled to the insert; and a processor. The insert is movable along a longitudinal axis of the slot. Each of the plurality of imaging devices is positioned adjacent an external surface of the insert and is configured to capture an image of a portion of the slot adjacent the imaging device. The processor is configured to receive data corresponding to the images captured by the plurality of imaging devices. There is also described a method of inspecting a slot using the inspection device.

13 Claims, 9 Drawing Sheets (51) Int. Cl.
*G01N 21/954* (2006.01)
*G06T 7/00* (2017.01)
*G01N 21/956* (2006.01)

(52) U.S. Cl.
CPC ..... *G01N 21/954* (2013.01); *G01N 21/95692* (2013.01); *G06T 7/0004* (2013.01); *G01N 2021/9546* (2013.01); *G06T 2207/30164* (2013.01)

(56) References Cited

U.S. PATENT DOCUMENTS

| | | | | |
|---|---|---|---|---|
| 2006/0245087 | A1* | 11/2006 | Tearney | G02B 21/006 359/819 |
| 2008/0245980 | A1 | 10/2008 | Diatzikis | |
| 2011/0081230 | A1* | 4/2011 | Dimelow | B64D 15/20 415/118 |
| 2013/0135457 | A1* | 5/2013 | Kell | F01D 25/285 348/82 |
| 2016/0025653 | A1* | 1/2016 | Jalilian | A61B 1/00039 356/241.1 |
| 2016/0239955 | A1* | 8/2016 | Guy | B23K 26/382 |
| 2018/0156062 | A1* | 6/2018 | Dede | F01D 21/003 |

FOREIGN PATENT DOCUMENTS

| | | |
|---|---|---|
| EP | 2679778 | 1/2014 |
| EP | 2597273 A3 | 2/2018 |

OTHER PUBLICATIONS

European search report dated Jun. 14, 2019, issued in EP Patent Application No. 19152940.

Response to the European Extended Search Report dated Jun. 25, 2019 from counterpart EP Application No. 19152940.3, filed Jan. 6, 2020, 37 pgs.

\* cited by examiner

INSPECTION DEVICES AND METHODS OF INSPECTING A SLOT

CROSS-REFERENCE TO RELATED APPLICATIONS

This application is based upon and claims the benefit of priority from UK Patent Application Number 1802693.0 filed on 20 Feb. 2018, the entire contents of which are incorporated herein by reference.

BACKGROUND

Technological Field

The disclosure relates to inspection devices and methods of inspecting a slot.

Description of the Related Art

The safety of aircraft systems is of critical importance. Many aircraft components are visually inspected in order to identify defects arising during the manufacturing process or after a period of use. Often, surfaces of aircraft components requiring inspection are located in hard-to-access areas. A common way of inspecting such surfaces includes inserting a stainless steel mirror into the area, orienting the stainless steel mirror so as to direct an image of the surface towards the user and viewing the reflected image of the surface through a pair of binoculars. Such a process is difficult, expensive and time-consuming.

It is therefore desirable to provide an improved inspection device and method of inspecting a slot.

SUMMARY

According to a first aspect of the disclosure, there is provided an inspection device for inspecting a slot of a gas turbine engine. The inspection device comprises: an insert for insertion into the slot; a plurality of imaging devices coupled to the insert; and a processor. The insert is movable along a longitudinal axis of the slot. Each of the plurality of imaging devices is positioned adjacent an external surface of the insert and is configured to capture an image of a portion of the slot adjacent the imaging device. The processor is configured to receive data corresponding to the images captured by the plurality of imaging devices.

The insert may have an external profile, a portion of which corresponds to an internal profile of the slot.

The slot may be a fir-tree slot.

The plurality of imaging devices may be arranged at multiple heights along the insert.

Each of the imaging devices may have a field of view. The total field of view of the imaging devices may span substantially an entire height of the slot.

The inspection device may further comprise a plurality of illumination devices coupled to the insert. The plurality of illumination devices may be positioned adjacent an external surface of the insert. Each of the plurality of illumination devices may be configured to illuminate a portion of the slot adjacent the illumination device.

The insert may be substantially transparent and acts as a light guide.

Each of the imaging devices may comprise a bundle of optical fibres.

Each of the imaging devices may comprise a camera disposed adjacent the external surface of the insert.

The processor may be configured to generate a single image from the data.

The inspection device may further comprise a display configured to display images based on the data.

According to a second aspect of the disclosure, there is provided a method of inspecting a slot using the inspection device of any preceding statement. The method comprises: inserting the insert into the slot at a first position; capturing an image using each of the imaging devices with the insert at the first position; moving the insert to one or more further positions; and capturing an image using each of the imaging devices with the insert at the one or more further positions.

The method may further comprise illuminating the slot using one or more illumination devices.

Images of the entire length and height of at least one side of the slot may be captured.

A single image of the entire length and height of the slot may be generated based on the images.

DESCRIPTION OF THE DRAWINGS

Arrangements will now be described, by way of example, with reference to the accompanying drawings, in which.

DETAILED DESCRIPTION

Figure 1:
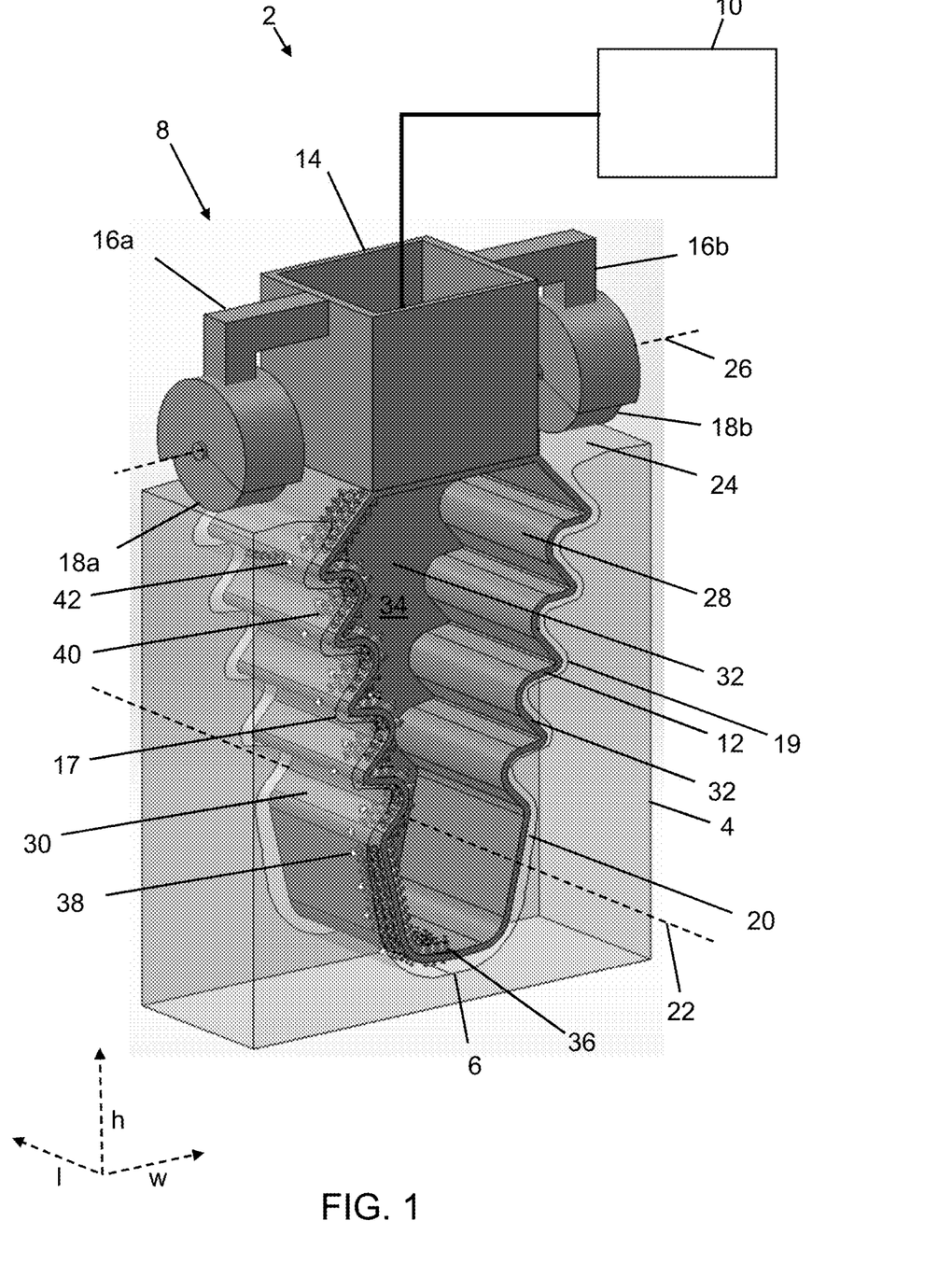
FIG. 1 is a perspective view of a first example inspection device for inspecting a slot of a component.

FIG. 1 shows an inspection device 2 for inspecting a component 4 having a slot 6. The inspection device 2 generally comprises an insert 8 and an imaging system 10. The insert 8 comprises a guide 12, a base 14, first and second arms 16a, 16b and first and second wheels 18a, 18b.

The base 14 has a square cross-sectional profile. The first arm 16a and the second arm 16b extend from opposing sides of the base 14. The first wheel 18a is attached to an end of the first arm 16a and the second wheel 18b is attached to an end of the second arm 16b. The slot 6 has a first side 17 and a second side 19. The first side 17 is a pressure side of the slot 6. The first wheel 18a and the second wheel 18b engage with an upper surface 24 of the component 4 on opposing sides of the slot 6, adjacent the first and second sides 17, 19. The first and second wheels 18a, 18b are configured to rotate about an axis of rotation 26 extending perpendicularly to a longitudinal axis 22 of the slot 6.

The guide 12 extends from a lower surface of the base 14 such that the guide 12 is supported within the slot 6. The guide 12 is formed by a contoured plate 28. The plate 28 comprises a first side portion 30 and a second side portion 32. When the guide 12 is disposed within the slot 6, the first side portion 30 faces the first side 17 of the slot 6 and the second side portion 32 faces the second side 19 of the slot 6. The guide 12 is bounded at one of its ends by an end plate 34 and is open at its other end.

An outer surface of the guide 12 has a cross-sectional profile substantially corresponding to and inwardly offset from the cross-sectional profile of the inner surface of the slot 6. In the example arrangement shown, the component 4 is a disc of a gas turbine engine and the slot 6 forms part of a fir-tree joint. Accordingly, the inner surface of the slot 6 has a fir-tree-shaped cross-section and the outer surface of the guide 12 has a fir-tree-shaped cross-section corresponding to but slightly smaller than the fir-tree-shaped cross-section of the inner surface of the slot 6. Accordingly, a gap 20 is formed between the inner surface of the slot 6 and the outer surface of the guide 12. The guide 12 is therefore able to move along the slot 6 along the longitudinal axis 22 of the slot 22 upon rotation of the first and second wheels 18a, 18b about the axis of rotation 26. The guide 12 has a constant cross-section along its length, with the length dimension being represented by the letter I in FIG. 1.

A first plurality of holes and a second plurality of holes (not shown) extend through the first side portion 30 of the plate 28 between a hollow interior 34 of the guide 12 and an exterior of the guide 12. The first plurality of holes are arranged along the height of the guide 12 between a lower end of the guide 12 and an upper end of the guide 12, with the height dimension being represented by the letter h in FIG. 1. The second plurality of holes are also arranged along the height of the guide 12.

A first optical fibre housing 36 (shown in grey in FIG. 1) is attached to each of the first plurality of holes. A bundle of first optical fibres 40a, 40b (not shown in FIG. 1) configured for conveying image data is supported by each first optical fibre housing 36 and extends through each of the first plurality of holes. A second optical fibre housing 38 (shown in white in FIG. 1) is attached to each of the second plurality of holes. A bundle of second optical fibres 42 (not shown in FIG. 1) suitable for conveying light is supported by each second optical fibre housing 38 and extends through each of the second plurality of holes. The ends of the bundle of first optical fibres 40a, 40b and the bundles of second optical fibres 42 terminate at the outer surface of the guide 12. The bundles of first optical fibres 40a, 40b and the bundles of second optical fibres 42 are optically connected to the imaging system 10.

Figure 2:
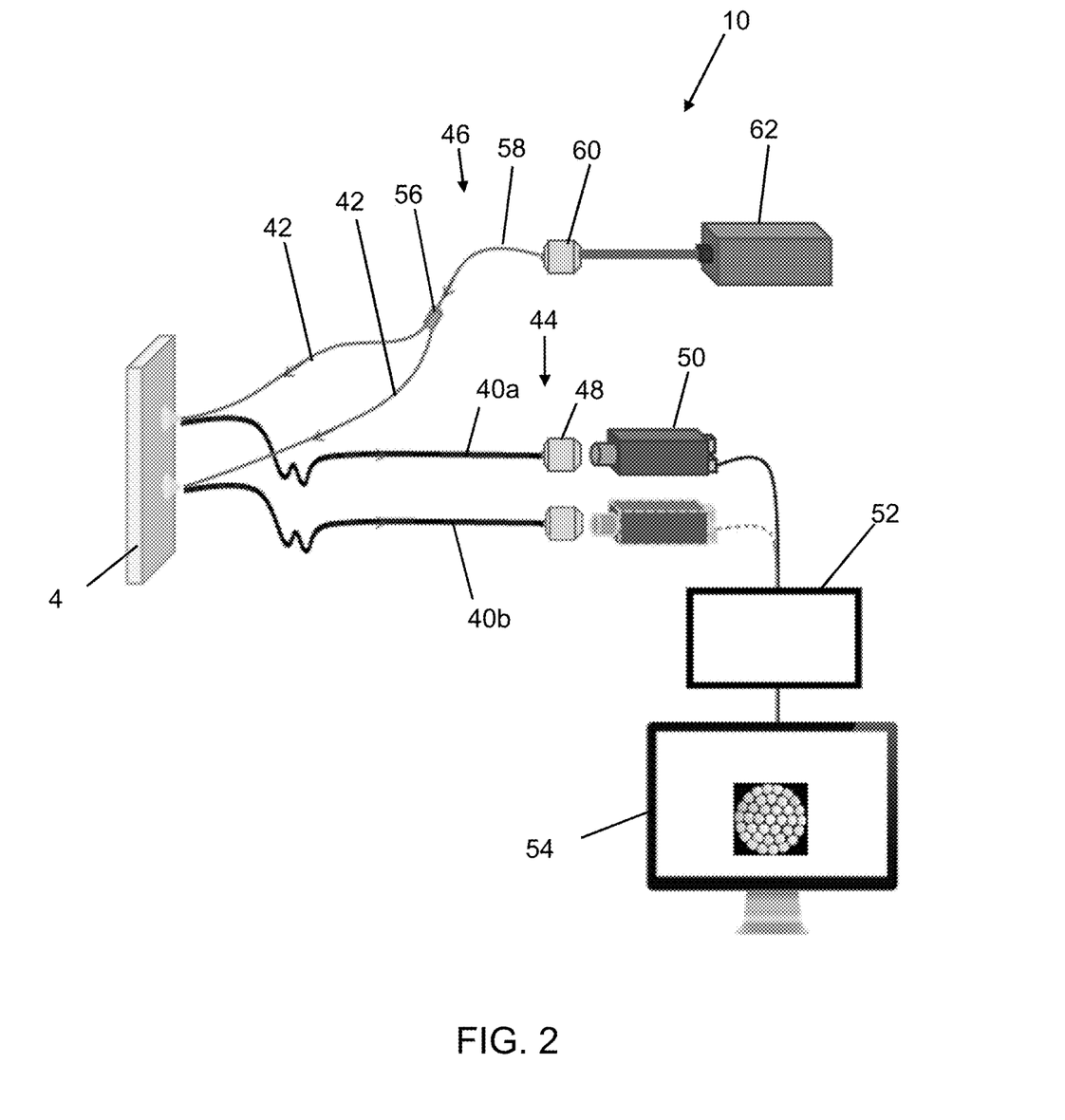
FIG. 2 is a schematic view of an imaging system of the inspection device.

FIG. 2 is a schematic view of the imaging system 10 of the inspection device 2. The imaging system 10 generally comprises an imaging segment 44 and an illumination segment 46.

The imaging segment 44 comprises the plurality of bundles of first optical fibres 40a, 40b referred to previously. The imaging segment 44 additionally comprises an objective lens 48, a CCD camera 50, a computer 52 and a monitor 54. Only two bundles of first optical fibres 40a, 40b are shown in FIG. 2, for clarity. The objective lens 48 is optically connected to one of the plurality of bundles of first optical fibres 40a, 40b. In FIG. 2, the objective lens 48 is optically connected to the bundle of first optical fibres 40a. The CCD camera 50 is positioned adjacent the objective lens 48 so as to record optical images received therefrom. The objective lens 48 and the CCD camera 50 are movable between each of the plurality of bundles of first optical fibres 40a, 40b (as indicated in dashed lines in FIG. 2). The CCD camera 50 is connected to the computer 52, which is in turn connected to the monitor 54.

The illumination segment 46 comprises the plurality of bundles of second optical fibres 42 referred to previously. The illumination segment 46 additionally comprises a beam splitter 56, a single mode fibre 58, an objective lens 60 and a laser source 62. Only two bundles of second optical fibres 42 are shown in FIG. 2, for clarity. Each of the plurality of bundles of second optical fibres 42 are optically connected to the beam splitter 56. The beam splitter 56 is optically connected to the objective lens 60 by the single mode fibre 58.

Figure 3:
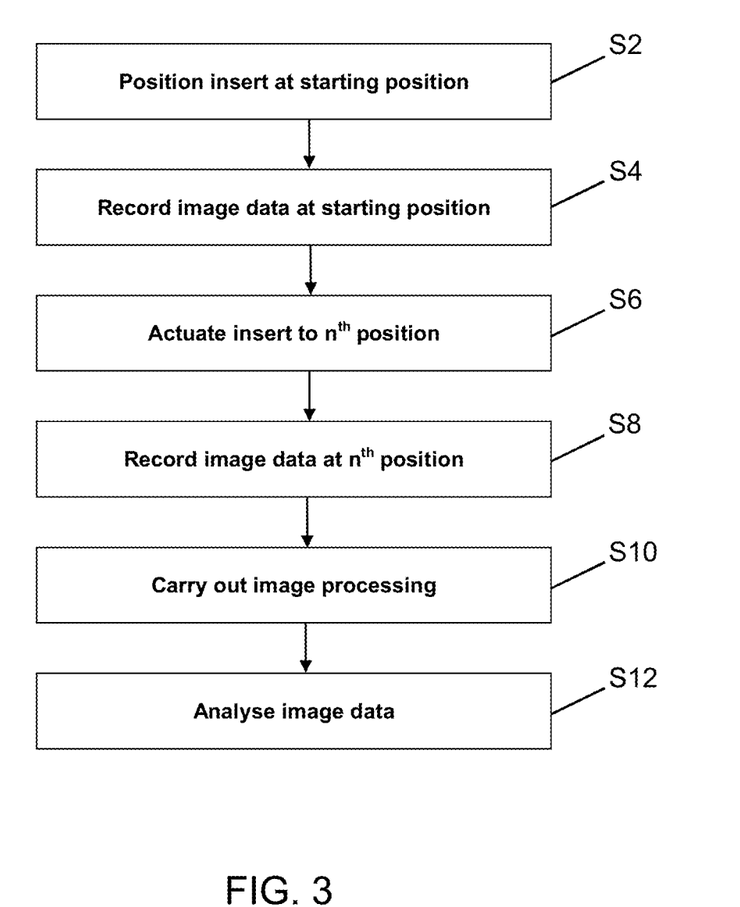
FIG. 3 is a flow diagram of a method performed using the inspection device.

The operation of the inspection device 2 will now be described with reference to FIG. 3, which shows a flow diagram of an inspection method performed using the inspection device 2, and additionally with reference to FIGS. 1 and 2.

During step S2, the insert 8 is positioned within the slot 6 at a starting position as shown in FIG. 1. In the starting position, the ends of the bundles of first optical fibres 40a, 40b are positioned adjacent an end of the first side 17 of the slot 6.

During step S4, the laser source 62 generates a laser beam that passes into the objective lens 60, along the single mode fibre 58 and into the beam splitter 56. The beam splitter 56 splits the laser beam into multiple laser beams, each of which pass into a separate one of the plurality of bundles of second optical fibres 42. The laser beams pass along the plurality of bundles of second optical fibres 42, through the second plurality of holes extending through the first side portion 30 of the plate 28, and out of the ends of the plurality of bundles of second optical fibres 42, thereby illuminating a portion of the slot 6 adjacent the ends of the plurality of bundles of second optical fibres 42.

Light from the illuminated slot 6 passes into the plurality of bundles of first optical fibres 40a, 40b, through the first plurality of holes extending through the first side portion 30 of the plate 28 and along the plurality of bundles of first optical fibres 40a, 40b. The light from the bundle of first optical fibres 40a passes into the objective lens 48. The objective lenses 48 produces an image of the inner surface of the slot 6 adjacent the end of the bundle of first optical fibres 40a. The arrangement and proximity of each of the first plurality of holes ensures that fields of view of each of the plurality of bundles of first optical fibres 40a, 40b overlap in a height dimension.

The CCD camera 50 captures the image generated by objective lens 48 and sends the resulting image data to the computer 52. The objective lens 48 and CCD camera 50 then move to a next bundle of first optical fibres (i.e. in the arrangement shown in FIG. 2, the bundle of first optical fibres 40b). The CCD camera 50 then captures another image generated by the objective lens 48 in this next position (i.e. an image of the inner surface of the slot 6 adjacent the end of the bundle of first optical fibres 40b) and sends the resulting image data to the computer 52. This process is repeated with the objective lens 48 and CCD camera 50 positioned at all of the bundles of first optical fibres 40a, 40b until image data has been captured for all of the bundles of first optical fibres 40a, 40b. Accordingly, image data is captured for a first portion of the surface of the first side 17 of the slot 6 spanning an entire height of the slot 6. Since the profile of the insert 8 substantially corresponds to the profile of the slot 6, the insert 8 is unable to move in the width or height direction, and, thus, the ends of the bundle of first optical fibres 40a, 40b are positioned a fixed distance from the interior wall of the slot 6. This fixed distance allows the camera to focus.

During step S6, the insert 8 is then actuated to a second position adjacent the starting position. In particular, the guide 12 is actuated along the longitudinal axis 22 of the slot 6.

During step S8, step S4 is repeated such that image data is captured for a second portion of the surface of the first side 17 of the slot 6 adjacent the first portion and spanning an entire height of the slot 6. The distance by which the insert 8 is actuated during step S6 is small enough that the combined field of view of the plurality of the bundles of first optical fibres 40a, 40b when the insert 8 is in the second position overlaps the combined field of view of the bundles of first optical fibres 40a, 40b when the insert 8 is in the first position in a length direction.

Steps S6 to S8 are repeated multiple times so as to capture image data at multiple positions (i.e. n positions) along the length of the slot 6 until image data across the entirety of the length of the first side 17 of the slot 6 is captured.

During step S10, the image data captured as a result of steps S2 to S8 is processed into a format suitable for analysis by a user. In particular, the images are combined into a single image using image stitching. The single image is displayed on the monitor 54.

During step S12, a user views the image displayed on the monitor 54. The user visually inspects the image displayed on the monitor 54. The user is able to detect any surface defects present in the first side 17 of the slot by looking at the image displayed on the monitor 54, such as corrosion, cracks or pits.

The slot 6 and the guide 12 are symmetrical. Accordingly, the guide 12 can be removed from the slot 6, reversed in direction and reinserted into the slot 6 such that the first side portion 30 faces the second side 19 of the slot 6 and the second side portion 32 faces the first side 17 of the slot 6. Steps S2 to S12 can then be repeated so as to allow the user to analyse the second side 19 of the slot.

Figure 4:
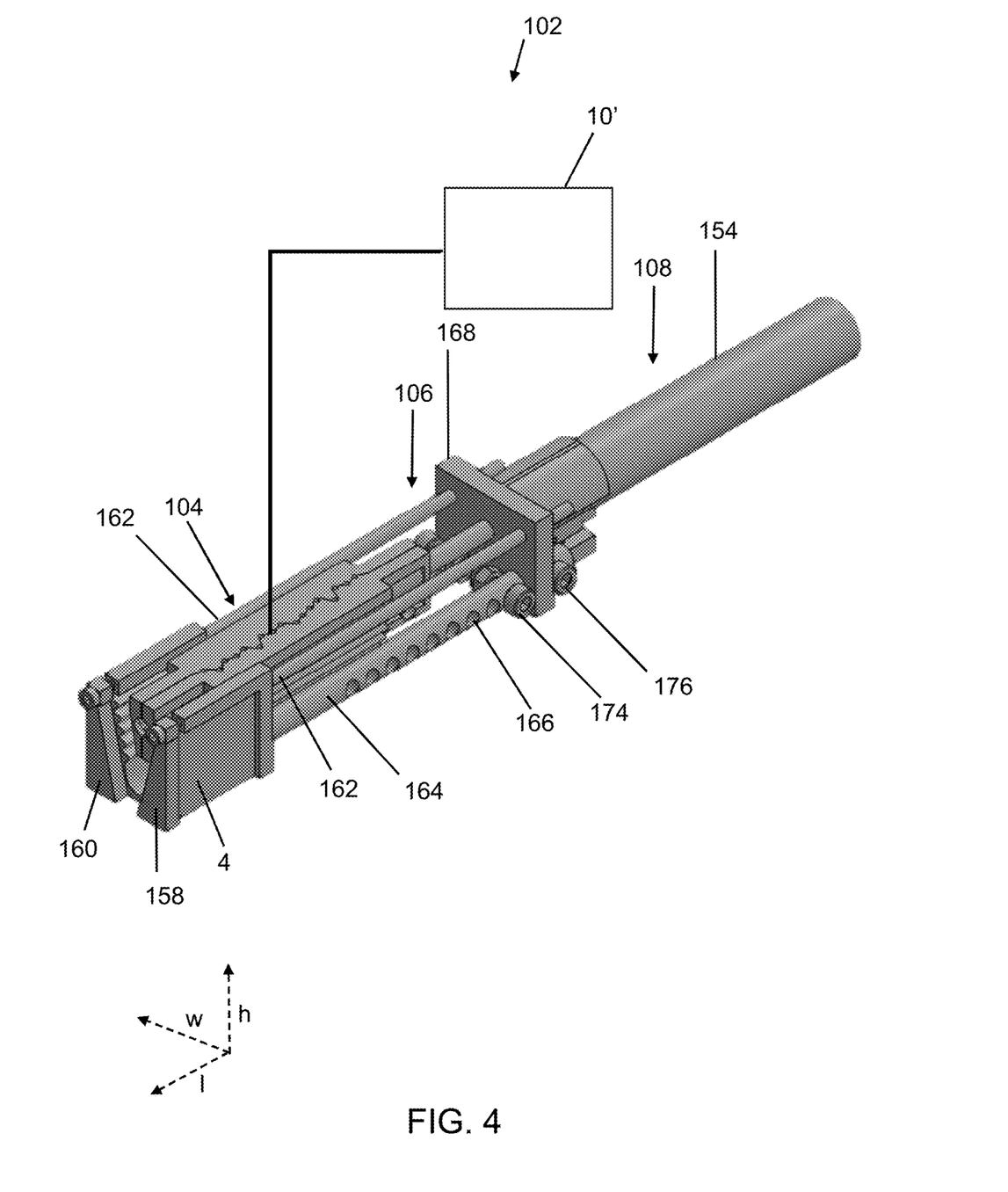
FIG. 4 is a perspective view of a second example inspection device for inspecting a slot of a component.

FIG. 4 shows an alternative inspection device 102 for inspecting the component 4. The inspection device 102 generally comprises an insert 104, a jig 106, a linear variable differential transformer (LVDT) 108 and an imaging system 10' substantially corresponding to the imaging system 10 described with reference to FIGS. 1 to 3. The same dimensional references (i.e. length l, width w and height h) are used to describe the inspection device 102.

Figure 5:
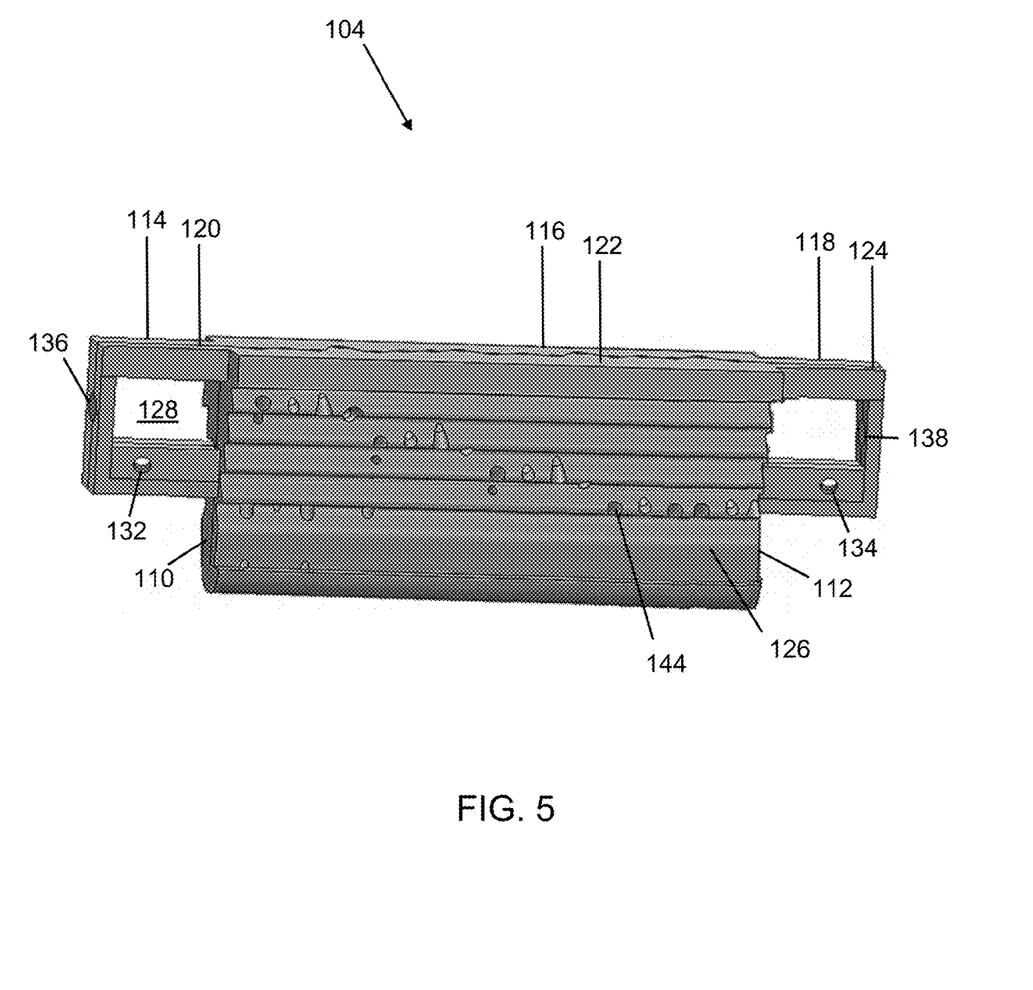
FIG. 5 is a side view of an insert of the second example inspection device.

FIG. 5 shows the insert 104 in isolation. The insert 104 comprises a support part 110 and an inspection part 112. The support and inspection parts 110, 112 are transparent. The support and inspection parts 110, 112 may be 3D printed, for example. The support part 110 comprises a rearward portion 114, a middle portion 116 and a forward portion 118. The inspection part 112 also comprises a rearward portion 120, a middle portion 122 and a forward portion 124. The rearward and forward portion 114, 118 of the support part 110 are narrower than the middle portion 116. Likewise, the rearward and forward portion 120, 124 of the inspection part 112 are wider than the middle portion 122. Accordingly, the support and inspection parts 110, 112 each have a generally T-shaped profile when viewed from above. The support part 110 has a first surface 125 (not shown in FIG. 5) that abuts a first surface 127 (not shown in FIG. 5) of the inspection part 112. The support part 110 further comprises a second surface 129 (not shown in FIG. 5) opposing the first surface of the support part 110 and forming a first side surface of the insert 104. Likewise, the inspection part 112 further comprises a second surface 126 opposing the first surface of the inspection part 112 and forming a second side surface of the insert 104.

The rearward portions 114, 120 of the support and inspection parts 110, 112 define rectangular openings that together form a first rectangular through hole 128 extending across the width of the insert 104. Likewise, the forward portions 118, 124 of the support and inspection parts 110, 112 define rectangular openings that together form a second rectangular through hole 130 extending across the width of the insert 104. Further, the rearward portions 114, 120 of the support and inspection parts 110, 112 define circular openings that together form a first circular through hole 132 extending across the width of the insert 104. Likewise, the forward portions 118, 124 of the support and inspection parts 110, 112 define circular openings that together form a second circular through hole 134 extending across the width of the insert 104. In addition, the rearward portions 114, 120 of the support and inspection parts 110, 112 define semi-circular slots that together form a third circular through hole 136 extending part way along the length of the insert 104. Likewise, the forward portions 118, 124 of the support and inspection parts 110, 112 define semi-circular slots that together form a second circular through hole 138 extending part way along the length of the insert 104.

Figure 6:
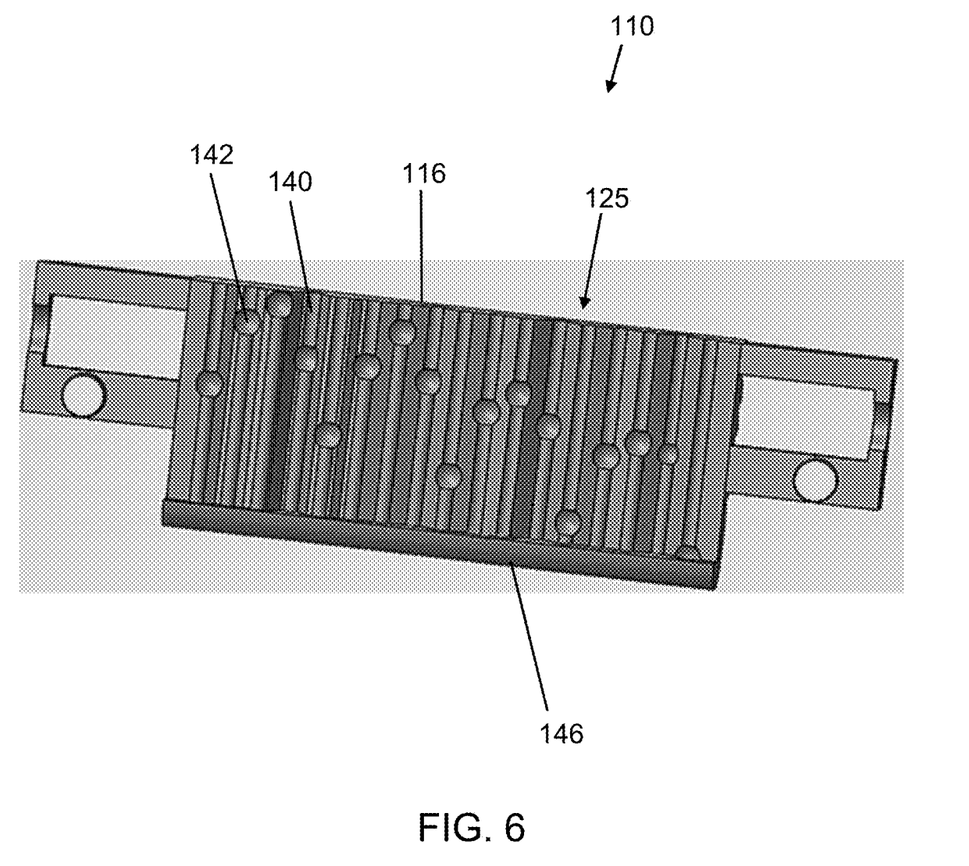
FIG. 6 is a side view of a support part of the insert.

FIG. 6 shows the support part 110 in isolation with its first surface 125 showing. The first surface 125 has an undulating (i.e. contoured) profile. A plurality of semi-circular slots 140 are formed in the first surface 125. The plurality of semi-circular slots 140 extend in a heightwise direction between a lip 146 and an upper surface of the middle portion 116. A hemispherical indentation 142 is provided in each of the semi-circular slots 140. Each of the hemispherical indentations 142 is disposed a distinct length along its respective semi-circular slot 140.

Returning to FIG. 5, the first surface of the inspection part 112 has an undulating profile corresponding to the undulating profile of the first surface 125 of the support part 110. Further, a plurality of semi-circular slots are formed in the first surface of the inspection part 112. The plurality of semi-circular slots formed in the first surface of the inspection part 112 correspond to the plurality of semi-circular slots 140 of the formed in the first surface 125 of the support part 110. In addition, a plurality of through holes 144 extend through the middle portion 122 of the inspection part 112 in a widthwise direction between the first and second surface 127, 126 of the inspection part 112. Each of the plurality of through holes 144 extends from the second surface 126 of the inspection part 112 at a position corresponding to the position of a separate one of each of the hemispherical indentations 142. A passageway is formed by each through hole 144 and its corresponding semi-circular slots between the upper surface of the insert 104 and the second surface 126 of the inspection part 112. A camera (not shown) is disposed at the end of each of the through holes 114, adjacent the second surface 126. Each of the cameras may be a "Micro ScoutCam" having a 1.2 millimetre diameter, camera resolution of approximately 49000 pixels, five optic elements, 100/130 degree field of view and 5 to 50 millimetre or 2 to 6 millimetre depth of field, for example. A camera wire (not shown) extends between each of the cameras and a computer of the imaging system 10', which corresponds to the computer of the 52 of the imaging system 10. Each of the camera wires extends through a separate one of each of the passageways. The hemispherical indentations 142 provided in each of the semi-circular slots 142 allows the camera wires to bend. The spacing of the through holes 144 in the height dimension is sufficiently small that the height dimensions of each of the fields of view of the cameras overlap in the height dimension.

Figure 7:
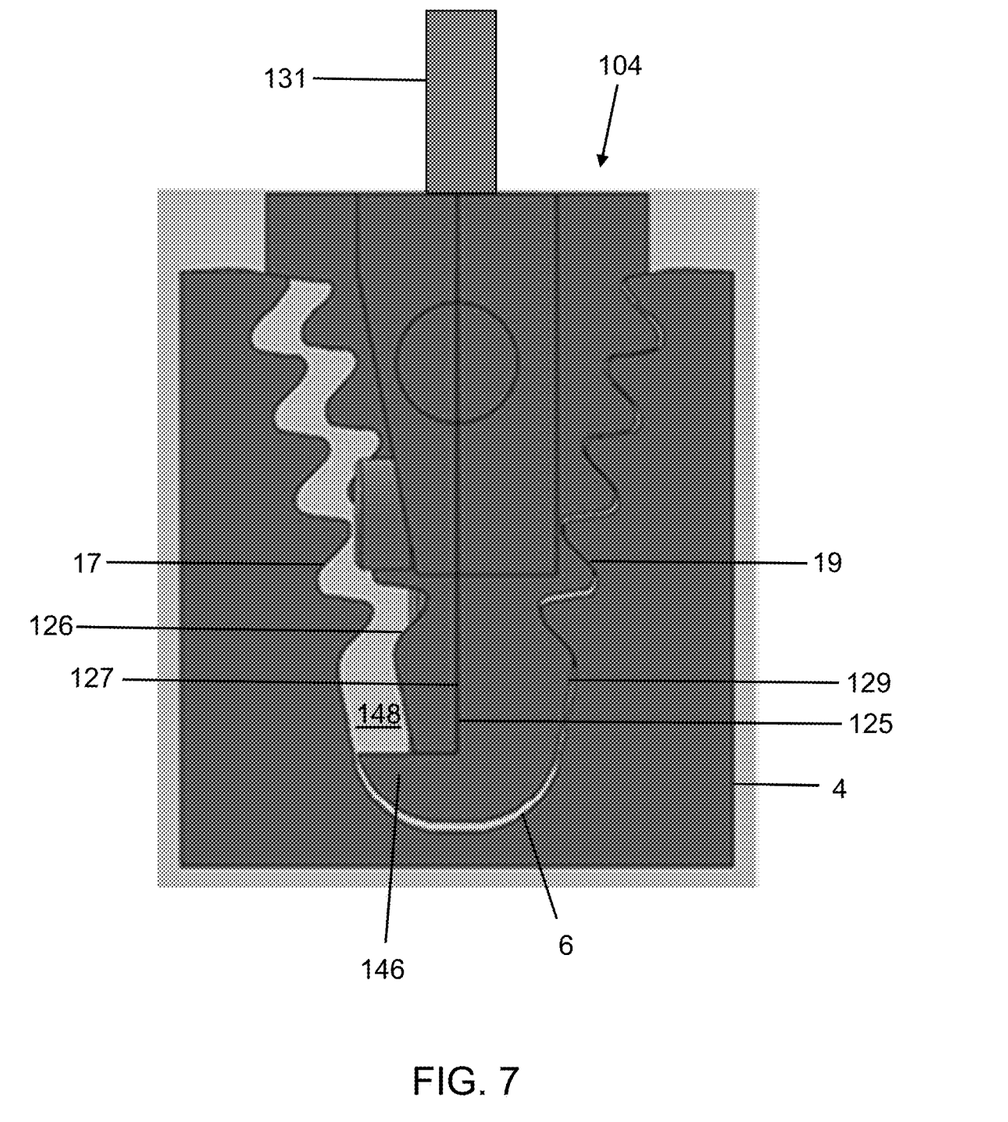
FIG. 7 is a cross-sectional view of the insert positioned within the slot.

FIG. 7 shows a cross-sectional view of the insert 104 within the slot 6. The component 4 shown in FIG. 7 corresponds to that shown in FIG. 1. The profile of the second surface 129 of the support part 110 substantially corresponds to the profile of the second side 19 of the slot 6. The lip 146 extends from a lower edge of the support part 110 beyond the inspection part 112. The profile of the lip 146 substantially corresponds to the profile of a lower portion of the first side 17 of the slot 6. The profile of the second surface 126 of the inspection part 112 substantially corresponds to the profile of the first side 17 of the slot 6 but is offset therefrom towards the first surface 127 such that that a gap 148 is formed between the second surface 126 of the inspection part 112 and the first side 17 of the slot 6. A light 131, in particular a high intensity flexible light guide (not shown in the remaining figures), is provided at an upper surface of the insert 104. The light 131 is oriented to direct light into the insert 104.

Figure 8:
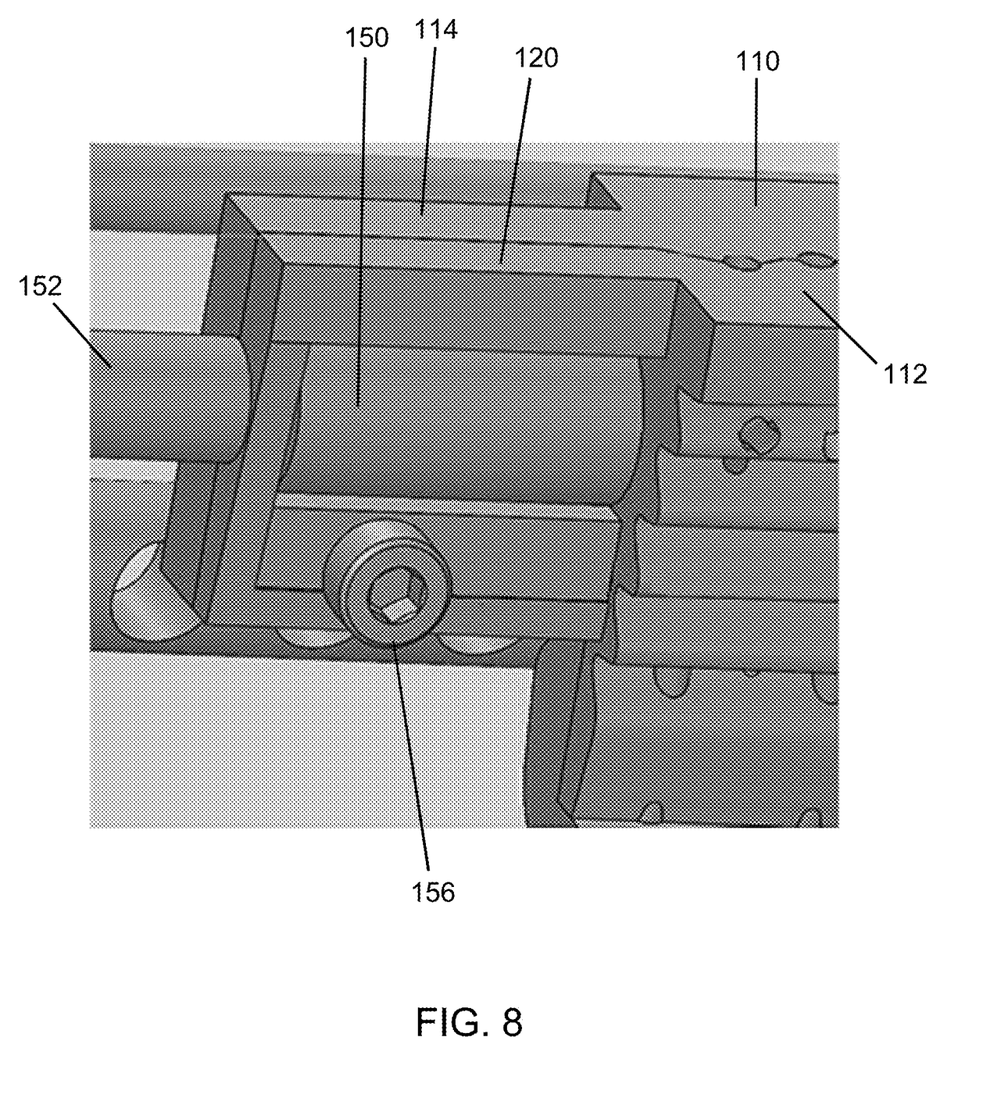
FIG. 8 is a close-up view of a portion of the insert.

FIG. 8 shows a close-up view of the rearward portions 114, 120 of the support and inspection parts 114, 120. The LVDT 108 comprises a probe head 150, a shaft 152 and a housing 154 (see FIG. 4). The shaft 152 extends between the probe head 150 and the housing 154. The probe head 150 is disposed within the first rectangular through hole 128. The shaft 152 extends through the third circular through hole 136. A bolt 156 extends through the first circular through hole 132 so as to secure the rearward portions 114, 120 (and thus the support and inspection parts 110, 112) together and so as to secure the probe head 150 and shaft 152 to the insert 104. A further bolt (not shown) also extends through the second circular through hole 134 so as to secure the forward portions 118, 124 together.

Returning to FIG. 4, the jig 106 comprises a first clamp 158 and a second clamp 160. The first and second clamps 158, 160 each comprise a screw mechanism for securing the first and second clamps 158, 160 to the component 4. A pair of upper rods 162 extend from the upper end of each of the first and second clamps 158, 160. A pair of lower rods 164 (only one of which is shown in FIG. 4) extend from the lower end of each of the first and second clamps 158, 160. Each of the lower rods 164 comprise a plurality of through holes 166 disposed at increments along their length.

The jig 106 further comprises a plate 168 comprising a central hole, a pair of upper through holes 170 and a pair of lower through holes 172 (not shown in FIG. 4). The pair of upper rods 162 extend through the pair of upper through holes 170 and the pair of lower rods 164 extend through the pair of lower through holes 172. A pair of first bolts 174 and a pair of second bolts 176 extend through the through holes 166 of each of the lower rods 164 such that the plate 168 is disposed between the pair of first bolts 174 and the pair of second bolts 176. Accordingly, the first and second bolts 174, 176 hold the plate 168 in position relative to the first and second clamps 158, 160 and thus the component 4. The first and second bolts 174, 176 can be repositioned in different through holes 166 so as to reposition the plate 168. The plate 168 may need to be repositioned to be closer to the component 4 if a shorter insert 104 (i.e. an insert 104 having a smaller length dimension) is used, for example.

Figure 9:
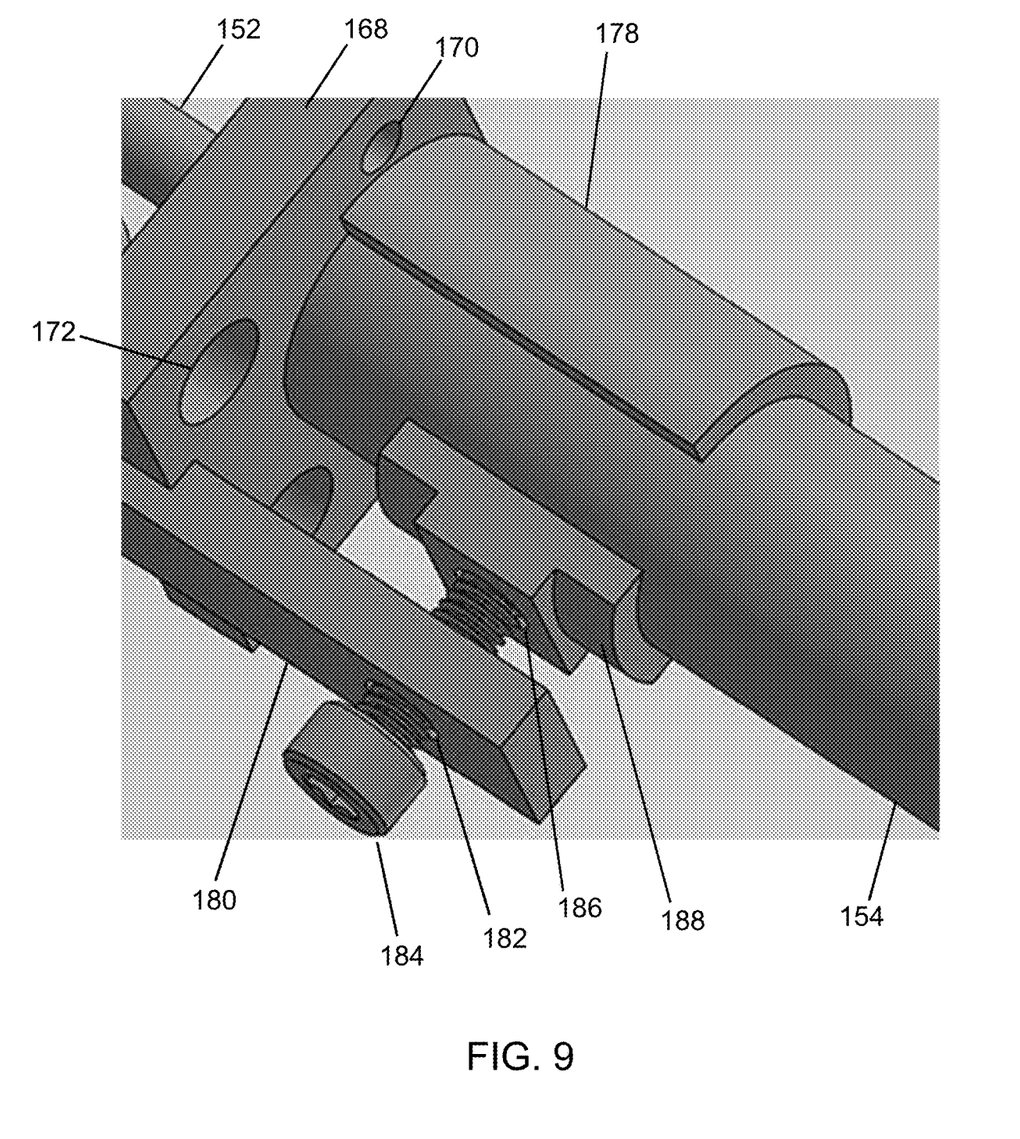
FIG. 9 is a close-up view of a portion of a jig of the second example inspection device.

FIG. 9 shows a close-up view of the interface between the plate 168 and the LVDT 108. The upper and lower rods 162, 164 are not shown in FIG. 9. A first flange 178 extends from a rear surface of the plate 168. The first flange 178 is arc-shaped in cross-section and has a radius equivalent to the radius of the housing 154 of the LVDT 108. A second arm 180 also extends from a rear surface of the plate 74. The second arm 180 comprises a threaded hole 182 through which a bolt 184 extends. An end of the bolt 184 is supported within a recess 186 of a support member 188. The support member 188 comprises a surface having an arc-shaped cross-section with a radius equivalent to the radius of the housing 154 of the LVDT 54.

The housing 154 of the LVDT 108 is positioned between the first flange 178 and the support member 188 such that the shaft 152 of the LVDT 108 extends through the central hole of the plate 168 and the housing 154 abuts the plate 168. The bolt 184 is rotated within the threaded hole 182 so as to actuate the support member 188 towards the housing 154 and secure the housing 154 in place relative to the plate 168. The shaft 152 of the LVDT 108 is linearly actuable relative to the housing 154 such that the shaft 152 is able to move linearly through the central hole. The extent of actuation of the LVDT 108 determines the position of the insert 104 within the slot 6.

As mentioned above, the imaging system 10' of the alternative inspection device 102 substantially corresponds to the imaging system 10 of the inspection device 2. However, the illumination segment of the imaging system 10' comprises the light 131, the support part 110 and the inspection part 112 rather than the components of the illumination segment 46 referred to previously.

The operation of the alternative device 102 substantially corresponds to the operation of the inspection device 2, with some minor differences. For example, during step S2, the jig 106 is attached to the component 4 and the LVDT 108 is actuated to a starting position such that the insert 104 is in a starting position. During step S4, the slot 6 is illuminated by switching on the light 131. In particular, light emitted from the light 131 enters the transparent support and inspection parts 110, 112, passes along the interior of the support and inspection parts 110, 112, exits the support and inspection parts 110, 112 and illuminates the slot 6. The light entering the support and inspection parts 110, 112 is spread out as it passes along the interior of the support and inspection parts 110, 112. Accordingly, the support and inspection parts 110, 112 act as light guides and diffusers. Step S6 involves actuating the LVDT 108 to a second position (and subsequent positions) such that the insert 104 is in a second position (and subsequent positions).

Although it has been described that the inspection devices 2, 102 are used to inspect a slot 6 having a fir-tree-shaped cross-section, the inspection devices 2, 102 could instead be used to inspect slots 6 having any cross-sectional profile. In such arrangements, the inserts 8, 104 may have cross-sectional profiles corresponding to the cross-sectional profiles of the slots 6. The inspection devices 2, 102 may be designed using CAD software and manufactured using 3D printing.

Although it has been described that the guide 12 is bounded at one of its ends by an end plate 32 and is open at its other end, the guide 12 may alternatively be bounded at both of its ends by opposing end plates or be open at both of its ends.

Although it has been described that the inspection device 2 illuminates a portion of the slot 6 by way of a plurality of bundles of second optical fibres 42, the insert 8 may instead be wholly or partially transparent such that it acts as a light guide, as per the insert 104 of the inspection device 102. Further, although it has been described that the insert 104 of the inspection device 102 acts as a light guide, the insert 102 may instead be provided with a plurality of bundles of second optical fibres to illuminate the slot 6, as per the insert 8 of the inspection device 2.

It has been described that the component 4 is a disc of a gas turbine engine. However, the inspection devices 2, 102 can instead be used to inspect any type of component 4. For example, the inspection devices 2, 102 can be used to inspect components found in other fields or industries such as the marine industry.

In the example arrangement shown, the component 4 is a disc of a gas turbine engine and the slot 6 forms part of a fir-tree joint.

Although it has been described with reference to the inspection device 2 that a laser is used to illuminate the slot 6, any type of illumination source may be used. Further, any type of fibres may be used. The illumination source and/or the fibres may be selected in order to illuminate the slot 6 with a particular wavelength or wavelengths of light.

In alternative arrangements, fluorescent penetrant inspection can additionally be used to inspect the slot 6 of the component 4. In such arrangements the light source is an ultraviolet light source and the slot 6 is illuminated with ultraviolet light.

Although it has been described that all of the image data of the slot 6 is gathered before being displayed on the monitor 54, the image data may alternatively be displayed on the monitor 54 in real-time. Snapshots of the image data may be taken in real-time.

It has been described that during step S10, the images are combined into a single image using image stitching. However, in alternative arrangements the images are not combined into a single image and are instead presented separately on the monitor 54.

The abovementioned steps of operation of the devices 2, 102 may be manual or automated.

We claim:

1. An inspection device comprising:
    an insert configured to be inserted into a fir-tree slot of a gas turbine engine;
    a plurality of imaging devices coupled to the insert; and
    a processor;
    wherein the insert is configured to be moved along a longitudinal axis of the fir-tree slot;
    wherein the insert has an external profile,
    wherein a portion of the external profile of the insert corresponds to an internal profile of the fir-tree slot;
    wherein each of the plurality of imaging devices is positioned adjacent an external surface of the insert and is configured to capture an image of a portion of the slot adjacent the imaging device; and
    wherein the processor is configured to receive data corresponding to the images captured by the plurality of imaging devices.

2. The inspection device as claimed in claim 1, wherein the plurality of imaging devices are arranged at multiple heights along the insert.

3. The inspection device as claimed in claim 1, wherein each of the imaging devices has a field of view and wherein the total field of view of the imaging devices spans an entire height of the fir-tree slot.

4. The inspection device as claimed in claim 1, further comprising a plurality of illumination devices coupled to the insert and positioned adjacent an external surface of the insert, wherein each of the plurality of illumination devices is configured to illuminate a portion of the slot adjacent the illumination device.

5. The inspection device as claimed in claim 1, wherein the insert is substantially transparent and acts as a light guide.

6. The inspection device as claimed in claim 1, wherein each of the imaging devices comprises a bundle of optical fibres.

7. The inspection device as claimed in claim 1, wherein each of the imaging devices comprises a camera disposed adjacent the external surface of the insert.

8. The inspection device as claimed in claim 1, wherein the processor is configured to generate a single image from the data.

9. The inspection device as claimed in claim 1, further comprising a display configured to display images based on the data.

10. A method of inspecting a fir-tree slot, the method comprising:
    inserting an insert of inspection device into the fir-tree slot at a first position, wherein the inspection device comprises:
       the insert;
       a plurality of imaging devices coupled to the insert; and
       a processor,
       wherein the insert is configured to be moved along a longitudinal axis of the fir-tree slot,
       wherein the insert has an external profile,
       wherein a portion of the external profile corresponds to an internal profile of the fir-tree slot,
       wherein each of the plurality of imaging devices is positioned adjacent an external surface of the insert, and
       wherein the processor is configured to receive data corresponding to the images captured by the plurality of imaging devices;
    capturing an image using each of the imaging devices with the insert at the first position;
    moving the insert to one or more further positions; and
    capturing an image using each of the imaging devices with the insert at the one or more further positions.

11. The method of inspecting a fir-tree slot as claimed in claim 10, further comprising illuminating the fir-tree slot using one or more illumination devices.

12. The method of inspecting a fir-tree slot as claimed in claim 10, wherein images of the entire length and height of at least one side of the fir-tree slot are captured.

13. The method of inspecting a fir-tree slot as claimed in claim 12, wherein a single image of the entire length and height of the fir-tree slot is generated based on the images.

* * * * *